Dec. 1, 1942.    E. C. RANEY    2,304,018
CONTROL APPARATUS
Filed Sept. 25, 1939    2 Sheets-Sheet 1

INVENTOR
Estel C. Raney
BY
Schmieder
ATTORNEY

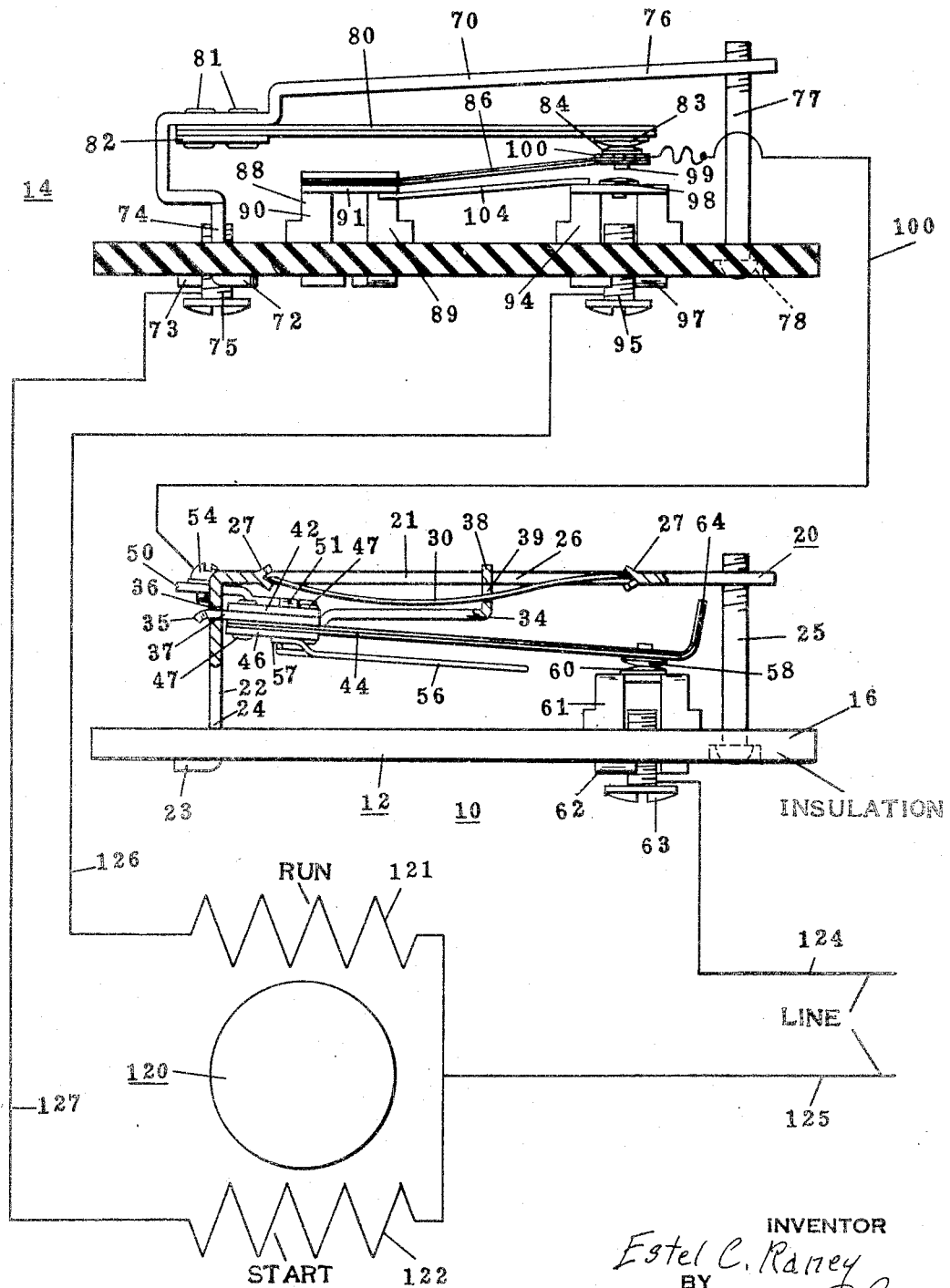

Patented Dec. 1, 1942

2,304,018

UNITED STATES PATENT OFFICE 2,304,018

CONTROL APPARATUS

Estel C. Raney, Columbus, Ohio, assignor to Ranco Incorporated, Columbus, Ohio, a corporation of Ohio Application September 25, 1939, Serial No. 296,426

4 Claims. (Cl. 200—113)

My invention relates to control apparatus and more particularly to apparatus for controlling the starting winding circuit of an electric motor and for protecting the motor from circuit overloads.

One object of the invention is to provide a circuit breaker for an electric motor, which circuit breaker is adapted to open the motor circuit in response to a current overload in the motor and to reclose the motor circuit after a period following the opening thereof, and to provide a thermally operable switch for controlling the starting winding circuit of the motor, which switch is adapted to be maintained open, after the motor is started, by an electric heater, the temperature of the thermal element of the switch being controlled so that the switch will reclose upon cooling of the element, prior to the reclosing of the motor circuit by the circuit breaker.

Another object of the invention is to provide a switch for controlling the starting winding of an electric motor, which switch is operated by a thermally actuated element that is directly heated by the initial flow of current through the motor circuit for opening the switch in a relatively short period of time, and having an electric heater that is energized in response to the flow of current through the motor during normal operation of the motor for maintaining the thermal element heated after opening of the switch.

A still further object of the invention is to provide a switch for controlling the starting winding circuit of an electric motor, which switch is operated by a bimetallic element, the element being connected in the motor circuit and so proportioned that the current required to start the motor will directly heat the bimetal and cause it to open the switch within a relatively short period, and providing an electric heater connected in the motor circuit for heating the bimetal during running of the motor for maintaining the switch open during running of the motor.

Still another object of the invention is to deenergize the bimetallic element and heater when the bimetal is heated to a predetermined degree and to reenergize the bimetallic element and heater when the temperature of the bimetal falls below the predetermined temperature.

Other and further objects and advantages will be apparent from the following description, reference being had to the accompanying drawings wherein a preferred form of embodiment of the present invention is clearly shown.

Fig. 4 is a diagrammatical showing of the control apparatus connected in a motor circuit, the control apparatus being shown in section and one part thereof being shown in a plane above the other.

Figure 1:
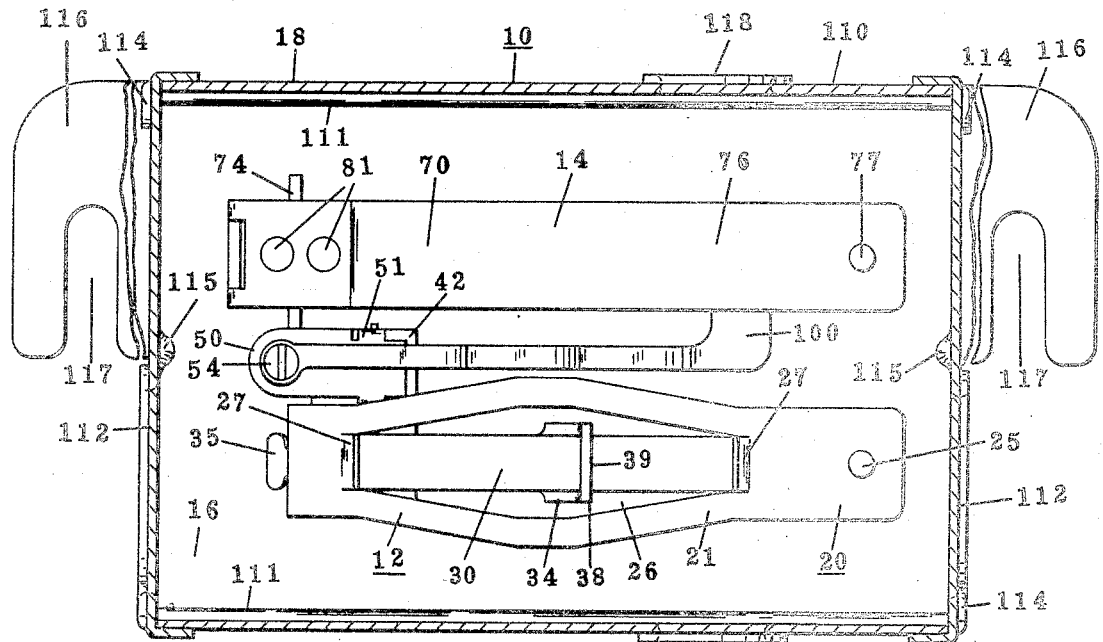
Fig. 1 is a top view of a motor controlling apparatus, the casing for the apparatus being shown in section and parts thereof being broken away.
Figure 2:
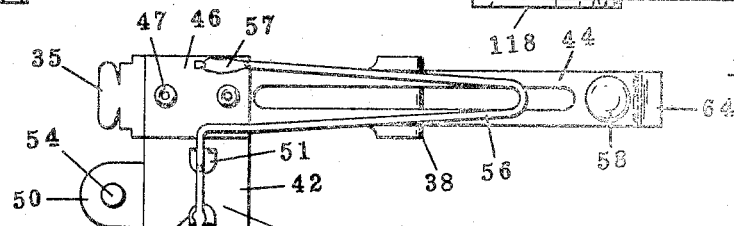
Fig. 2 is a bottom view of a thermally actuated element and heater therefor.

Referring to the drawings, an electric motor controlling apparatus is indicated generally at 10. The apparatus 10 comprises an overload switch device 12, and a starting circuit controlling switch device 14, which switches are mounted on an insulating base 16 and inclosed by a casing 18.

An L shaped metal frame member 20 including a section 21 and a leg 22, is secured to the base 16 for supporting parts of the overload switch 12. The leg 22 is secured to the base 16 by a neck 23 formed thereon, which neck is extended through the base 16 and turned against the underside thereof. The turned neck draws shoulders 24, formed by the neck 23, into engagement with the upper side of the base so that the neck and shoulders secure the leg firmly to the base. The section 21 is formed to normally spring upwardly, and an adjusting bolt 25 is extended through the base and is threaded in the section 21 for determining the position of the end of the section. The head of the bolt 25 is drawn into engagement with the underside of the base. A longitudinally extending opening 26 is formed in the section 21, and V notches 27 are formed in the end edges of the opening.

A flat leaf spring 30 is supported at either end in the notches 27. The spring 30 is longer than the opening 26 and the spring tends to arch or bow above or below the center of the section 21. When a portion of the spring is moved through the center line through the notches 27 the spring will shift its position with a snap action and tend to bow in the opposite direction. Preferably the ends of the spring 30 are beveled to form knife edge bearing points so that the spring may readily flex.

An arm 34 is loosely pivoted on the frame 20 by a neck 35 formed on the arm, which neck is extended through an opening 36 formed through the leg 22. The neck 35 is turned downwardly slightly to prevent accidental removal of the neck through the opening. The opposite end of the arm 34 is turned upwardly as at 38 and an opening 39 is formed therethrough. The spring 30 extends through the opening 39 and the opening is formed to provide substantial clearance between the spring and the edges thereof for providing a lost motion connection between the arm and the spring.

An insulating plate 42, one end of a bimetal strip 44 and a metal plate 46 are secured to the arm 34 by rivets 47. The insulating plate 42 extends laterally with respect to the arm 34 and a metal terminal plate 50 is attached to the plate 42 by ears 51 formed on the plate 50, one of which ears extends through the plate 42 and is turned against the underside of the plate 42 and the other of the ears 51 is turned over an edge of the insulating plate and against the underside thereof to frictionally secure the terminal plate to the insulating plate. A terminal screw 54 is threaded in the plate 50.

A hair pin shaped electric heating element 56 is silver soldered at one end 57 to the metal plate 46 and the other end of the heating element 56 is soldered to one of the ears 51 of the terminal plate 50. The heating element 56 extends directly under the bimetal 44.

Figure 3:
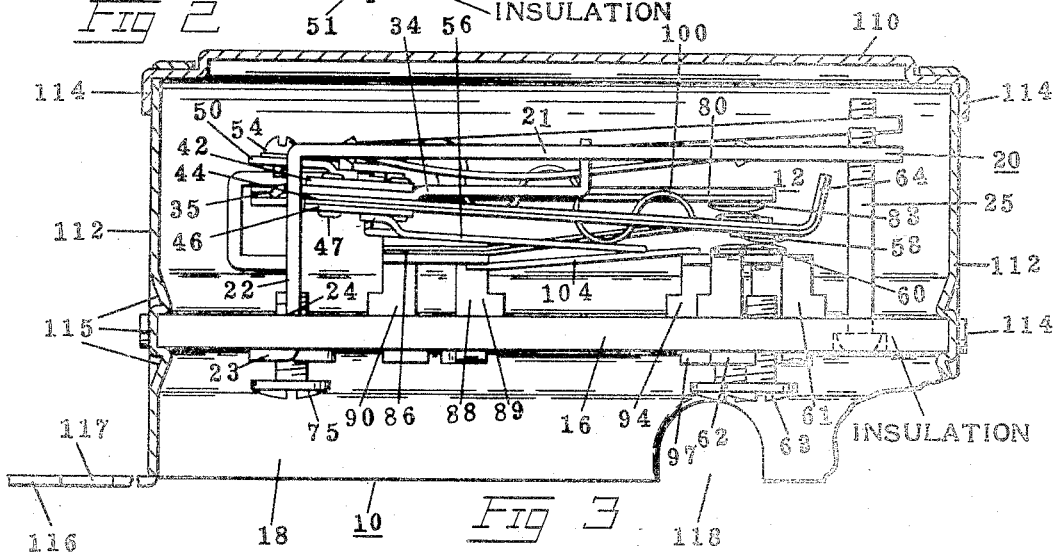
Fig. 3 is a side view of the apparatus shown in Fig. 1, part of the casing being shown broken away and part shown in section.

A contact 58 is secured to the bimetal strip 44 adjacent the end thereof, and when the bimetal is cool, the contact 58 engages a fixed contact 60 mounted on a bracket 61. The bracket 61 is formed in a U shape and is secured to the base 16 by lugs 62 formed on the ends of the legs of the bracket, which lugs extend through the base and are turned to engage the underside of the base. The edges of the lugs 62 are threaded to receive a terminal screw 63. The end 64 of the bimetal strip 44 is turned upwardly for engaging the frame 20 to limit upward movement of the end of the strip. The bimetal strip 44 is adapted to bow upwardly when the strip is heated, and when cool, the bimetal is straight, as shown in Fig. 3. When the bimetal 44 bows the end of the arm 34 is raised to cause the spring 30 to tend to bow upwardly with a snap action and quickly draw the arm 34 and bimetal 44 upwardly so that the upturned end of the bimetal will engage the frame and open the contacts 58 and 60. The arm 34 prevents complete reversal of the bow of the spring. When the bimetal cools, it draws the end of the arm 34 downwardly and causes the spring to bow downwardly and move the arm and bimetal downwardly with a snap movement and close the contacts 58 and 60.

The starting circuit controlling device 14 is positioned adjacent the overload device 12. A metal bracket 70 is secured at one end of the base 16 by a pair of spaced lugs 72 and 73 that are extended through the base and turned against the underside thereof. The turned lugs draw shoulders 74 against the top of the base and the shoulders and lugs rigidly secure the bracket 70 to the frame. The lugs 72 and 73 are threaded to receive a terminal screw 75. The portion of the bracket adjacent the base is furcated to receive the screw 75. The longitudinally extending section 76 is normally biased upwardly and an adjusting screw 77 is extended through the base 16 and threaded in the end of the section 76 to determine the position of the end of the section 76. The head of the adjusting screw 77 is inset in the base as shown at 78.

A bimetallic strip 80 is riveted at one end to the bracket 70 by rivets 81, a washer plate 82 being provided between the bimetal and rivet heads. A contact 83 is secured at the opposite end of the strip 80 and this contact is adapted to be engaged by a contact 84 carried on the end of a bimetallic strip 86. The contacts 83 and 84 comprise the starting winding switch. The strip 86 is secured at its other end to a metal bracket 88. The bracket 88 is formed having two legs 89 and 90 and a platform 91 to which the strip 86 is attached. The ends of the legs 89 and 90 extend through the base 16 and are turned against the underside of the base to secure the bracket thereto.

A bracket 94, similar to the bracket 61, is secured to the base by lugs 97 in a manner similar to the bracket 61 and a terminal screw 95 is threaded in the lugs 97. The bracket 94 carries a contact 98 that is positioned immediately below the end of the strip 86. A contact 99 is secured on the underside of the strip 86 for engaging the contact 98.

A conductor strip 100 is attached at one end to the end of the bimetal strip 86 and the opposite end of the metal strip 100 is connected to the terminal plate 50. The strip 100 is shaped sinuously for providing a connection with the bimetal 86 that will be flexible and which will not interfere with free movement of the bimetal.

A resistance wire or heater element 104 is connected between the brackets 88 and 94 and is disposed immediately beneath the bimetal strip 86.

The casing 18 is formed by a metal sheet 110 formed in a U shape. Longitudinally extending grooves 111 are formed in the opposite sides of the casing for receiving the side edges of the base 16. The ends of the casing are closed by end plates 112, which plates are formed having a turned flange around the edges that overlaps the end edges of the casing. The plates 112 are secured to the casing by ears 114, that are formed on the ends of the casing and which ears extend through slits in the plates 112 and are turned against the outside of the plates. The end plates 112 are formed with inwardly extending lugs 115 that receive the end edges of the base 16. The grooves 111 and lugs 115 prevent warping of the base 16 to insure proper operation of the apparatus. Mounting lugs 116 are formed on the plates 112 and a slot 117 for receiving a mounting bolt is formed in each lug. Openings 118 are formed in each side of the casing for admitting circuit wires to the interior of the casing.

Referring to Fig. 4, the control apparatus 10 is illustrated connected in the circuit of an electric motor 120. The motor 120 includes a running winding 121 and a starting winding 122. Current is supplied to the motor 120 through line wires 124 and 125.

The running winding circuit is traced from line 125, winding 121, wire 126, terminal 95, bracket 94, resistance wire 104, bracket 88, bimetal strip 86, conductor strip 100, terminal plate 50, resistance wire 56, bimetal strip 44, contacts 58 and 60, bracket 61 to line wire 124.

The starting winding circuit is traced from line 125, winding 122, wire 127, terminal 75, bracket 70, bimetal strip 80, contacts 83 and 84, conductor 100, and through the overload device 12, as described with reference to the running winding circuit, to line 124.

The operation of the apparatus is as follows: When the lines 124 and 125 are energized, both the running and starting winding circuits are energized and, until the motor has attained its normal running speed, the flow of current through motor will be heavy. The bimetal strip 86 is proportioned so that the initial heavy flow of current through the circuit will heat the bimetal and cause the same to deflect downwardly and open the starting winding circuit switch contacts 83 and 84 in one second, for example, the time normally required for the motor to attain running speed. The flow of current through the bimetal 86 during normal running of the motor will not heat the bimetal sufficiently to maintain the starting switch open during running of the motor. The heater 104, however, is proportioned to be heated sufficiently by the flow of current through the motor during normal operation thereof to heat the bimetal for maintaining the starting winding switch open.

The temperature of the bimetal 86 is limited, during running of the motor, by closing of the contacts 98 and 99, by the bimetal 86 when it is deflected by the heat of the resistance 104, thereby shunting the bimetal 86 and heater 104 out of circuit. The heater is reenergized when the bimetal 86 cools and separates the contacts 98 and 99. This limiting of the temperature of the bimetal causes the bimetal 86 to close the starting switch contacts 83 and 84 within a short time after the motor circuit is deenergized so that the starting winding circuit will be closed and ready for restarting of the motor.

The bimetal strip 80 varies the position of the contact 83 with the changes in ambient temperature so that the bimetallic element 86 will open the starting circuit switch in the same time period regardless of the ambient temperature. The strip 80 is adapted to flex in the same direction as the strip 86 on changes in ambient temperature. The bimetal 80, however, is practically unaffected by current flowing therethrough.

In the event of an abnormal flow of current through the motor for any reason, the heater 56 is adapted to heat the bimetal strip 44 and cause the latter to bow upwardly and operate the spring 30 to open the contacts 58 and 60 as described above. When the motor circuit is opened the heater 56 is deenergized and the bimetal strip 44 cools to operate the spring 30 to reclose the contacts 58 and 60 for reenergizing the motor circuit. The spring 30 provides a snap acting device for the switch contacts 58 and 60 and the force required to actuate the spring by the bimetal strip 44 imposes a time lag between opening and closing of the switch. During the interval between the opening and reclosing of the motor circuit, the starting winding switch contacts 83 and 84 will be reclosed due to the ready cooling of the bimetal 86. Thus when the motor is deenergized by the overload device 12, the starting winding control device 14 will reclose the starting winding circuit in advance of the reclosing of the motor circuit.

The time within which the starting winding control switch will open may be adjusted, within limits, by turning the screw 77. This raises or lowers the section 76 of the bracket 70 to raise or lower the end of the bimetal 80. If the opening time is to be shortened, the section 76 is raised so that the bimetal 86 will separate the contacts 83 and 84 at a lower temperature. If it is desired to increase the time in which the overload switch is opened the section 21 of the bracket 20 is raised by adjusting the screw 25. This requires the bimetal 44 to bow to a greater extent before the spring 30 will operate to open the switch. The closing period of the overload device may be controlled by adjusting the angle of the upturned end of the bimetal 44. If a longer closing period is desired, the end 64 is turned to form a greater angle with the strip 44 so that the end of the strip will raise higher.

While the form of embodiment of the present invention as herein disclosed constitutes a preferred form, it is to be understood that other forms might be adopted, all coming within the scope of the claims which follow.

I claim:

1. A switching mechanism comprising in combination, a frame; a snap acting device supported on the frame; a bimetal strip; means pivotally supporting the bimetal strip at one end thereof; means interconnecting the bimetal strip and the snap acting device for causing said strip to actuate the snap device and said device to move said strip about the pivot for the latter with a snap movement; means forming an abutment between the free end of the strip and the frame for limiting snap movement of the strip in one direction; means forming a stop for limiting movement of the strip by said device in the direction opposite the first mentioned direction; means for adjusting the position of the frame relative to the last mentioned stop; and a switch member connected with the free end of the bimetal.

2. A switching mechanism comprising in combination, a frame; a snap acting device supported on the frame; a bimetal strip; means pivotally supporting the bimetal strip at one end thereof; means interconnecting the bimetal strip and the snap acting device for causing said strip to actuate the snap device and said device to move said strip about the pivot for the latter with a snap movement; means forming an abutment between the free end of the strip and the frame for limiting snap movement of the strip in one direction; a contact member carried by the free end of the bimetal; a contact member fixed relative to the first mentioned contact and engageable by the latter, the second mentioned contact member forming a stop for limiting movement of the bimetal strip in a direction opposite the first mentioned direction; and means for adjusting the position of the frame relative to the second mentioned contact.

3. A switching mechanism comprising in combination, a snap acting mechanism including, a member capable of movement form one position toward another position gradually and after a predetermined movement movable to said other position with a snap movement; a bimetal strip pivotally supported at one end; means forming a stop against which the bimetal is engageable; means for interconnecting said movable member with the bimetal for causing the bitmetal, when bowed by change in temperature thereof, to move said member gradually from said one position toward said other position and cause snap movement of said member to said other position whereby said member moves the bimetal about its pivot and from said stop with a snap movement; and a switch member connected with the free end of the bimetal strip.

4. A switching mechanism comprising in combination, a snap acting mechanism including, a member capable of movement from one position toward another position gradually and after a predetermined movement movable to said other position with a snap movement; a bimetal strip pivotally supported at one end; a contact member mounted on said bimetal strip; a fixed contact member engageable by the first mentioned contact member and forming a stop against which the bimetal is engageable; means for interconning said movable member with the bimetal for causing the bimetal, when bowed by changes in temperature, to move said member gradually from said one position toward said other position and cause snap movement of said member whereby said member moves the bimetal about its pivot and separates said contacts with a snap movement.

ESTEL C. RANEY.